(12) United States Patent
Allen et al.

(10) Patent No.: US 7,461,939 B2
(45) Date of Patent: Dec. 9, 2008

(54) AUTOMATIC ZOOM FOR SCREEN FITTING

(75) Inventors: William J. Allen, Corvallis, OR (US);
David A. Williams, Corvallis, OR (US);
Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 10/993,811

(22) Filed: Nov. 19, 2004

(65) Prior Publication Data

US 2006/0109430 A1    May 25, 2006

(51) Int. Cl.
*G03B 21/26* (2006.01)
*G03B 21/00* (2006.01)
*G03B 21/14* (2006.01)
*G03B 3/00* (2006.01)
*H04N 5/64* (2006.01)
*H04N 3/223* (2006.01)
*H04N 3/227* (2006.01)
*G09G 5/00* (2006.01)

(52) U.S. Cl. .......... 353/30; 353/69; 353/101; 353/121; 348/744; 348/747; 345/660

(58) Field of Classification Search .......... 353/30, 353/31, 69, 70, 101, 102, 121, 122, 71; 352/40, 352/140; 345/127, 660; 348/744, 747
See application file for complete search history.

(56) References Cited

U.S. PATENT DOCUMENTS

| | | | |
|---|---|---|---|
| 5,128,550 A | 7/1992 | Erbeck | 250/559.01 |
| 5,721,565 A * | 2/1998 | Nguyen | 345/660 |
| 5,739,867 A | 4/1998 | Eglit | 348/581 |
| 5,860,721 A | 1/1999 | Bowron et al. | 353/101 |
| 5,920,361 A * | 7/1999 | Gibeau et al. | 348/750 |
| 5,990,982 A | 11/1999 | Gove et al. | 348/750 |
| 6,002,446 A | 12/1999 | Eglit | 348/581 |
| 6,067,071 A | 5/2000 | Kotha et al. | 345/142 |
| 6,323,915 B1 | 11/2001 | Marflak et al. | 348/704 |
| 6,367,933 B1 | 4/2002 | Chen et al. | 353/69 |
| 6,499,849 B1 | 12/2002 | Huang | 353/121 |
| 6,611,260 B1 | 8/2003 | Greenberg et al. | 345/204 |
| 6,987,531 B2 * | 1/2006 | Kamon | 348/211.4 |
| 2002/0024612 A1 | 2/2002 | Gyoten | 348/383 |
| 2002/0196366 A1 | 12/2002 | Cahill, III | 348/537 |
| 2003/0020885 A1 * | 1/2003 | Suzuki | 353/71 |
| 2004/0071211 A1 | 4/2004 | Washino | 375/240.01 |
| 2005/0259226 A1 * | 11/2005 | Gilg et al. | 353/69 |

* cited by examiner

Primary Examiner—Melissa J Koval

(57) ABSTRACT

A method for projecting an image with a projection system includes zooming a projected image in accordance with a resolution of the image, when a resolution of the image is less than a resolution corresponding to the projection system. A projection system for projecting an image based on a received video signal including optics having a corresponding resolution and a zoom control controlling a zoom of the optics. If a resolution of the image of the video signal is less than the resolution corresponding to the optics, the zoom control zooms a projected image.

46 Claims, 6 Drawing Sheets

AUTOMATIC ZOOM FOR SCREEN FITTING

BACKGROUND

Video projection systems are widely used in a variety of applications. For example, video projection systems, both forward and rear projection systems, are widely used in "big screen" home entertainment systems to provide a much larger picture than is economically available using a conventional cathode ray tube. Additionally, video projection systems may be used in a theater to display a movie or other video program, or still pictures for a relatively large audience.

Video projection systems are also used in business, education, training and other areas to display presentations such as, pictures, graphs, charts, outlines, etc., for a number of people to view. In one such example, video projection can make it possible for a relatively large number of people to observe a computer desktop and the work being done by an operator of the computer. Because video projection systems are so widely used, there is a constant desire to improve on known video projection systems.

Typically, a video signal is provided to a projection system. The projection system uses the video signal to produce the image or images that then are projected to a screen or other display surface.

The projection system will typically have a particular resolution, i.e., a grid of pixels of specific dimensions that can be used to display the desired image. If the video signal provided to the projection system includes image data at a lower resolution, i.e., fewer pixels, the lower resolution image can be upscaled to match the resolution of the projection system. Unfortunately, however, this upscaling may result in scaling artifacts in the projected image.

SUMMARY

A method for projecting an image with a projection system includes zooming said projected image in accordance with a resolution of the image, when a resolution of the image is less than a resolution corresponding to the projection system. A projection system for projecting an image based on a received video signal including optics having a corresponding resolution and a zoom control controlling a zoom of said optics. If a resolution of the image of the video signal is less than the resolution corresponding to the optics, the zoom control zooms a projected image.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

As used herein and in the appended claims, the terms "projection system" and "projector" will broadly refer to any device that projects an image onto a screen or other projection display surface. A projector may be, for example, a liquid crystal projector, a digital micro-mirror projector, etc. Also, as used herein and in the appended claims, the term "image" will be understood to broadly refer to any and all images that can be displayed by the projector including still images, a sequence of still images or motion picture video.

As described above, a given projection system will have a specific resolution. For example, a Super eXtended Graphics Array Plus (SXGA+) projection system has a resolution of 1400 pixels by 1050 pixels and a 1.33:1 aspect ratio.

A video signal input to the projection system, however, may have a lower resolution than the resolution of the projection system. For example, an SXGA image has a resolution of 1280 pixels by 1024 pixels, with a 1.25:1 aspect ratio. An XGA image has a resolution of 1024 pixels by 768 pixels, with a 1.33:1 aspect ratio.

If, for example, an SXGA+ projection system receives an SXGA or XGA image signal, the resolution of the image signal is lower than the resolution of the projection system. In such a case, some projectors will upscale the lower resolution image to the higher projection resolution. However, as mentioned above, this often results in unwanted scaling artifacts that reduce the quality of the projected image. For example, if the upscaled image includes a spreadsheet or a grid, the lines of the image may have an inconsistent thickness when upscaled.

Consequently, some digital projectors allow the user to disable the upscaling to avoid the scaling artifacts. This, however, results in the lower resolution image being displayed on the center of the projection field with a remaining border of pixels around the image that are unused, e.g., set to black. While only a portion of the projection field is used, because the image is not scaled, no unwanted scaling artifacts occur.

Projectors are often set up to produce an image that just fills a screen or other projection surface. This is particularly true where the projector or projection system is not portable and is fixed in relationship to the screen or other projection surface. In such a case, disabling the upscaling means that the lower-resolution image will not then fill the screen or projection surface. Rather, the un-scaled image produced is smaller than the available screen or projection display surface with an empty, perhaps black, border around the image.

Figure 2:
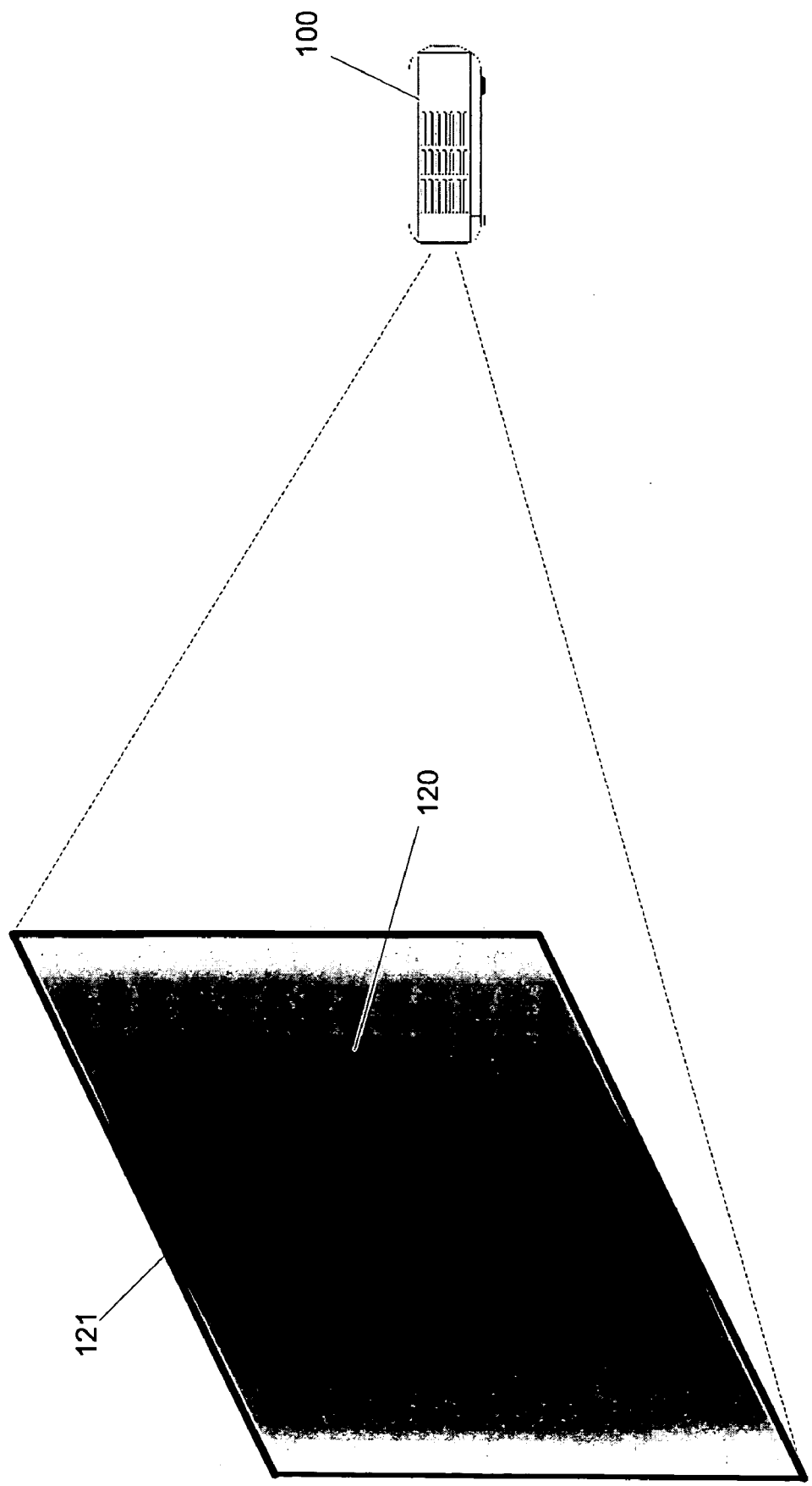
FIG. 2 illustrates a projection system projecting an image that matches, or has been upscaled to match, the resolution of the projection system.

FIG. 2 illustrates a projection system (100) that has been set up to project an image (120). The projection system (100) is arranged and configured such that the projected image (120) is sized to just fill a screen (121) or other projection surface. To achieve this effect, the image signal being used by the projection system (100) either matches the resolution of the projection system (100) or has been upscaled to match the resolution of the projection system (100), possibly resulting in unwanted scaling artifacts in the image (120).

Figure 3:
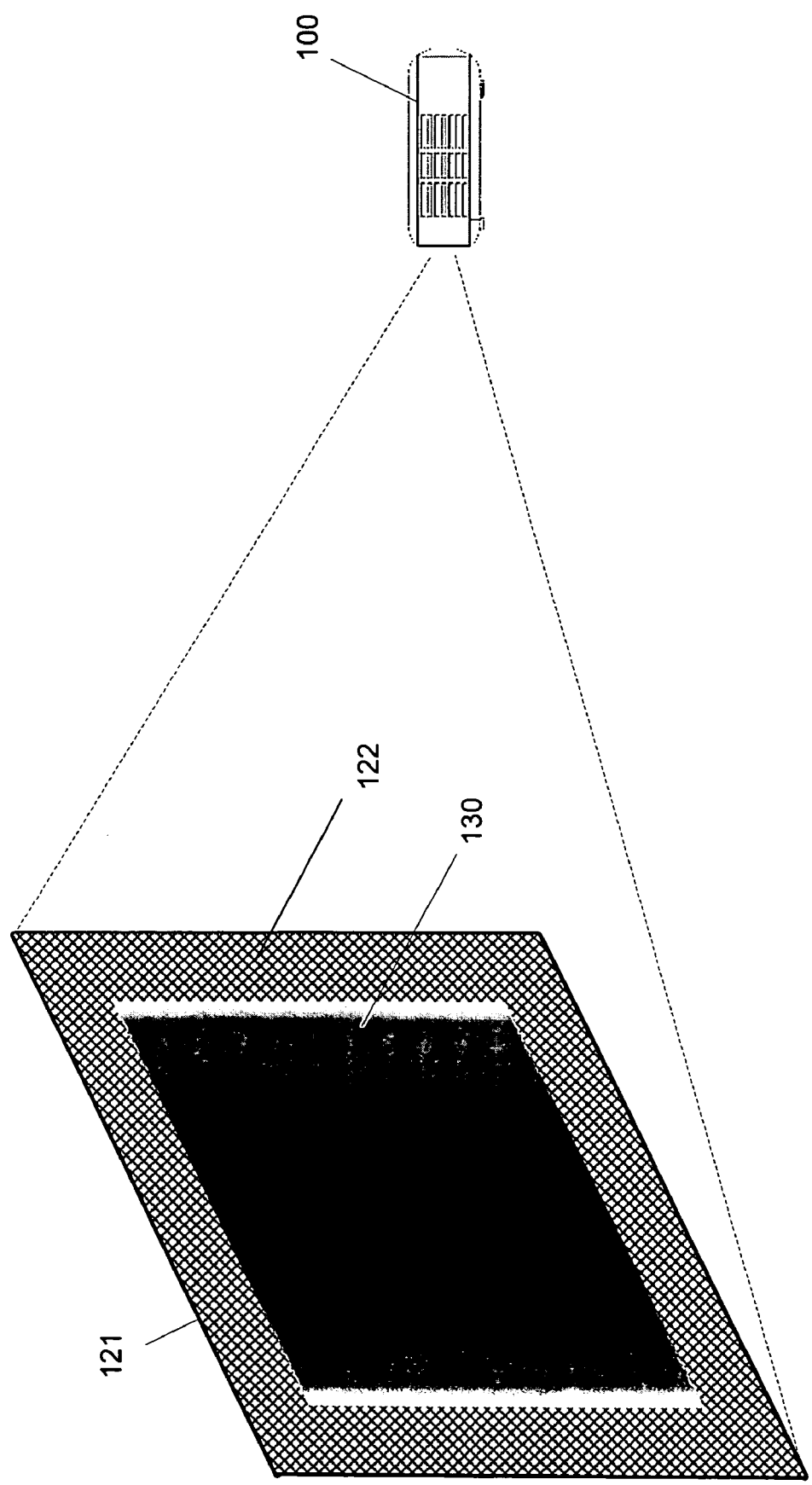
FIG. 3 illustrates a projection system projecting a lower-resolution image that has been projected without upscaling to avoid scaling artifacts.

FIG. 3 illustrates a lower-resolution image (130) that has been projected without upscaling to avoid unwanted scaling artifacts. As shown in FIG. 3, the un-scaled image (130) no longer fills the screen (121). Rather, an empty, black border (122) now appears around the image (130). The black border (122) represents and is produced by the pixels in the projector that are not used because the image is not upscaled.

The present specification describes methods and systems that allow a lower-resolution image to be displayed at the full size of screen or projection surface without upscaling and the consequent possibility of scaling artifacts. To utilize the entire screen area or projection surface without creating unwanted scaling artifacts, the projector (100) optically zooms to increase the size of the projected image. This is illustrated in FIG. 4.

Figure 4:
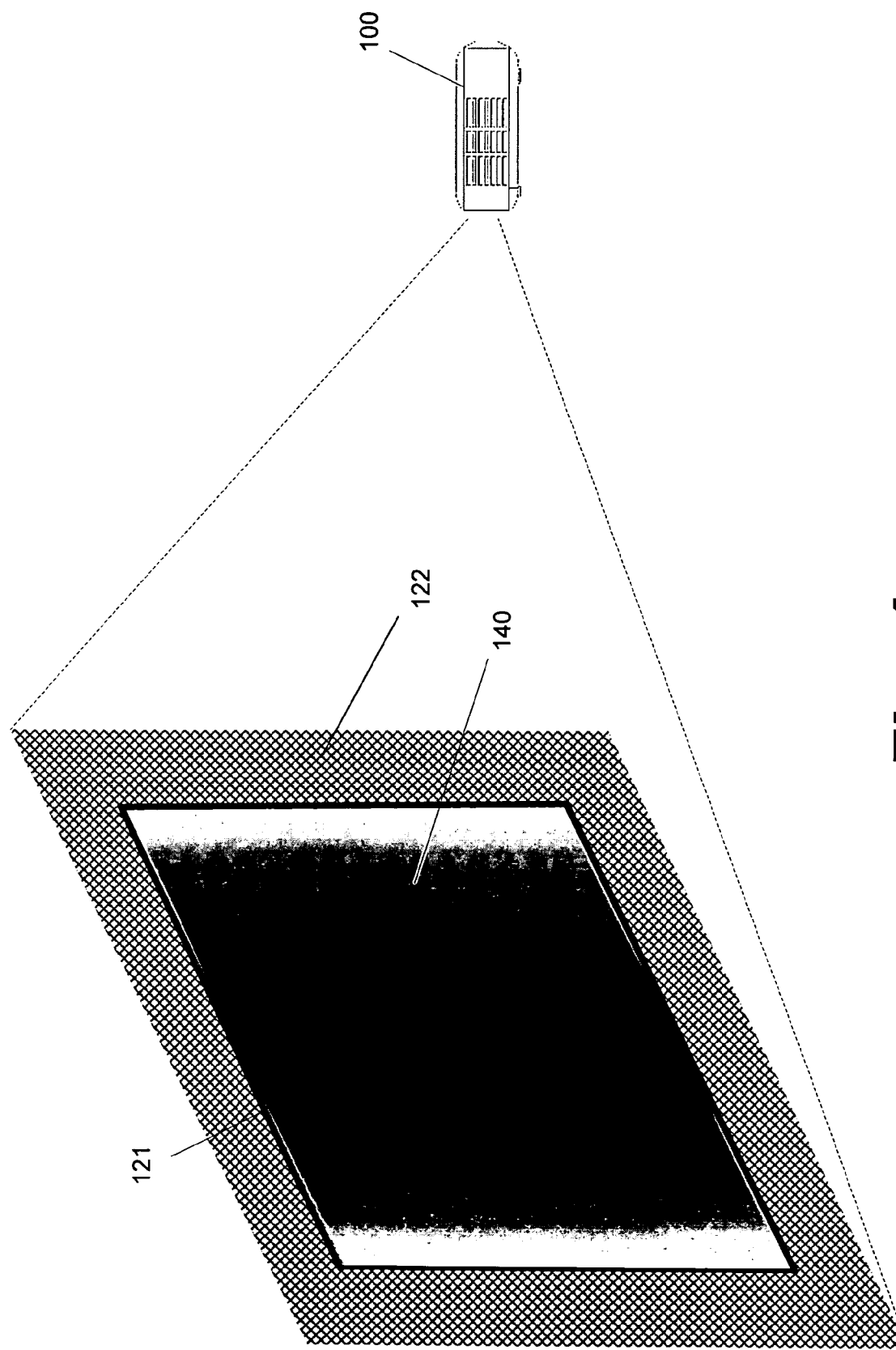
FIG. 4 illustrated operation of the projection system of FIG. 1 according to principles described herein.

As shown in FIG. 4, the projected image (140) is zoomed to increase in size such that the image (140) again fills the screen (121). The empty or black border (122) of the projected image then falls outside or surrounds the screen (121) or other projection surface. This will typically have no effect on the displayed image (140). In this way, the lower-resolution image (140) is made large enough to fill the available screen (121) or other projection surface without having to upscale the image and likely produce scaling artifacts.

Figure 1:
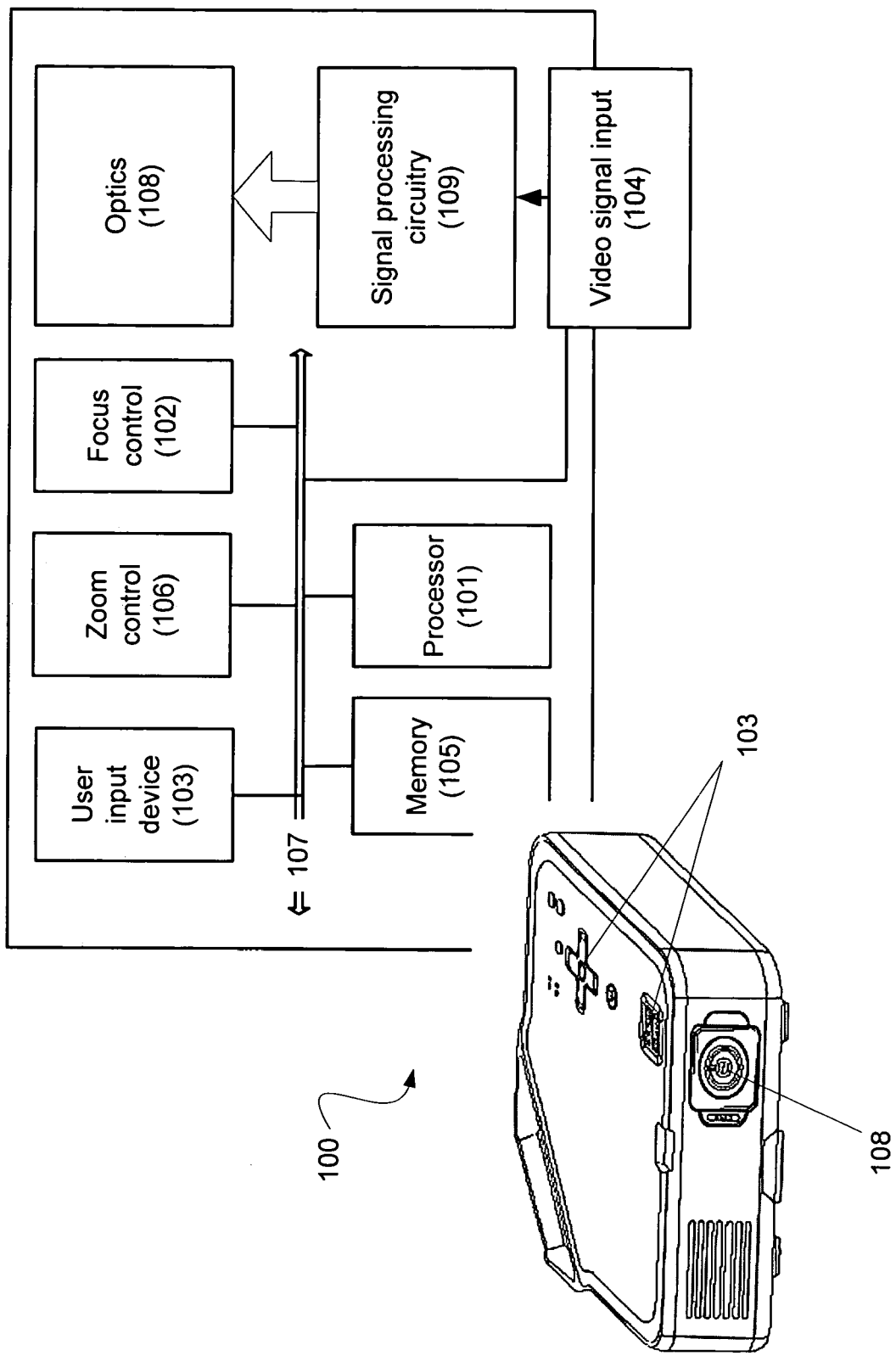
FIG. 1 is an illustration of an exemplary projection system according to principles described herein.

FIG. 1 is an illustration of an exemplary projection system according to principles described herein. As shown in FIG. 1, a projector (100) is configured to project a desired image based on an input video signal.

A processor (101) coordinates and controls the operation of the various components of the projector (100). A memory (105) stores the firmware or programming executed by the processor (101). A system bus (107) interconnects the internal elements of the projector (100).

The projector (100) includes a video signal input (104) through which the projector receives an electronic image signal that is used to produce the image(s) projected. The image signal received by the video signal input (104) is processed by signal processing circuitry (109). The processed signal is then used to produce the image projected by the projector.

The optics of the projector, which will be described in more detail below, use the processed image signal to visually produce and project the desired image. The optics (108) of the projector include, for example, at least one lens, a projection lamp for generating a projection light beam, a reflector for collecting the light from the projection lamp and a modulator (160, FIG. 6) for generating the image that is projected by the projector. The modulator may be, for example, a liquid crystal display or micro-mirror device. The projection light beam is shown through or reflected from the modulator to project the image formed on the modulator.

One or more of the elements of the projector optics (108) will also be moveable with respect to other optic elements to allow for adjustment of zoom and focus of the image projected by the projector. For example, the relative positions of various optical elements within the projection lens or the position of the lens assembly relative to the light modulator may be adjusted. The zoom of the projector determines the size of the image projected and depends upon the divergence angle of the projection beam produced by the projector. The focus of the projector determines the sharpness and clarity of the projected image and depends upon the relative positioning of the projector optics (108).

The projector (100) illustrated in FIG. 1 includes a zoom control (106) that controls the zoom of the projector (100). The zoom control (106) includes, for example, a motor for moving one or more components of the projector optics (108) relative to other optics components to adjust the zoom of the projector (100). Alternatively, in a laser-based projector, the zoom is not accomplished in the projection lens, but by changing the area of which the laser beam is swept or scanned. As used herein and in the appended claims, "zoom" will refer to any mechanism or method for changing the size of the projected image on the screen or other projection surface.

Returning to FIG. 1, the zoom control (106) is controlled by the processor (101) and/or by a user of the projector through a user input device (103). The user input device (103) will typically include any or several of dials, knobs, buttons, rocker switches, switches, etc. through which the user can control the projector (100).

The projector (100) also includes a focus control (102) that controls the focus of the projector (100). The focus control (102) also includes a motor for moving one or more components of the projector optics (108) relative to other optics components to adjust the focus of the projector (100). The focus control (102) can be controlled by the processor (101) and/or by a user of the projector through the user input device (103). Alternatively, the focus control (102) may include a manual control operated by the projector user.

As described above, when the video signal received through the input (104) is of a lower resolution than the resolution of the projector (100), the projected image is zoomed to fill the same space that would have been filed if the resolution of the video signal matched that of the projector (100). This is done, for example, by the processor (101) detecting the resolution of the input video signal and then operating the zoom control (106) to automatically adjust the zoom such that the projected images fills the screen or other projection surface as it would have if the resolution of the video signal matched that of the projector (100). The amount of the zoom needed depends on the resolution of the incoming video signal.

The user may adjust the zoom control (106) for each of a number of different image resolutions and store the resulting zoom settings in the memory unit (105). The processor (101) then automatically adjusts the zoom with the zoom control (106) based on the resolution of the image in the incoming video signal. Alternatively, the zoom settings corresponding to various different image resolutions may be stored in the memory (105) by the manufacturer of the projector (100).

After the image is zoomed to fill the desired space, the image may need to be refocused. In some cases, the optics may zoom through the required range without losing focus. However, if this is not the case, the focus control (102) is used to refocus the zoomed image. Operation of the focus control (102) following a zoom may be manual or automatic. In some examples, the user may determine and store focus settings in the memory unit (105) for each of the various anticipated zoom settings. The processor (101) then implements the focus settings from memory (105) when zooming to a particular corresponding zoom setting.

If the aspect ratio of the incoming data doesn't match the aspect ratio of the screen, the motorized zoom will not be able to enlarge the image in a way that exactly fits the screen. In such cases, the area of the screen may be changed to match the aspect ratio of the image, with or without a corresponding zoom. In some examples, automatic moving shutters positioned on two edges of the screen move to obscure some of the screen and, consequently, change the aspect ratio of the screen. Another possibility would be to selectively insert an anamorphic lens into the optical axis of the projector optics (108) to alter the aspect ratio of the projected image. These features may be automatically implemented if it is detected that the resolution or aspect ratio of the incoming video image is different than the screen or projection system.

Figure 5:
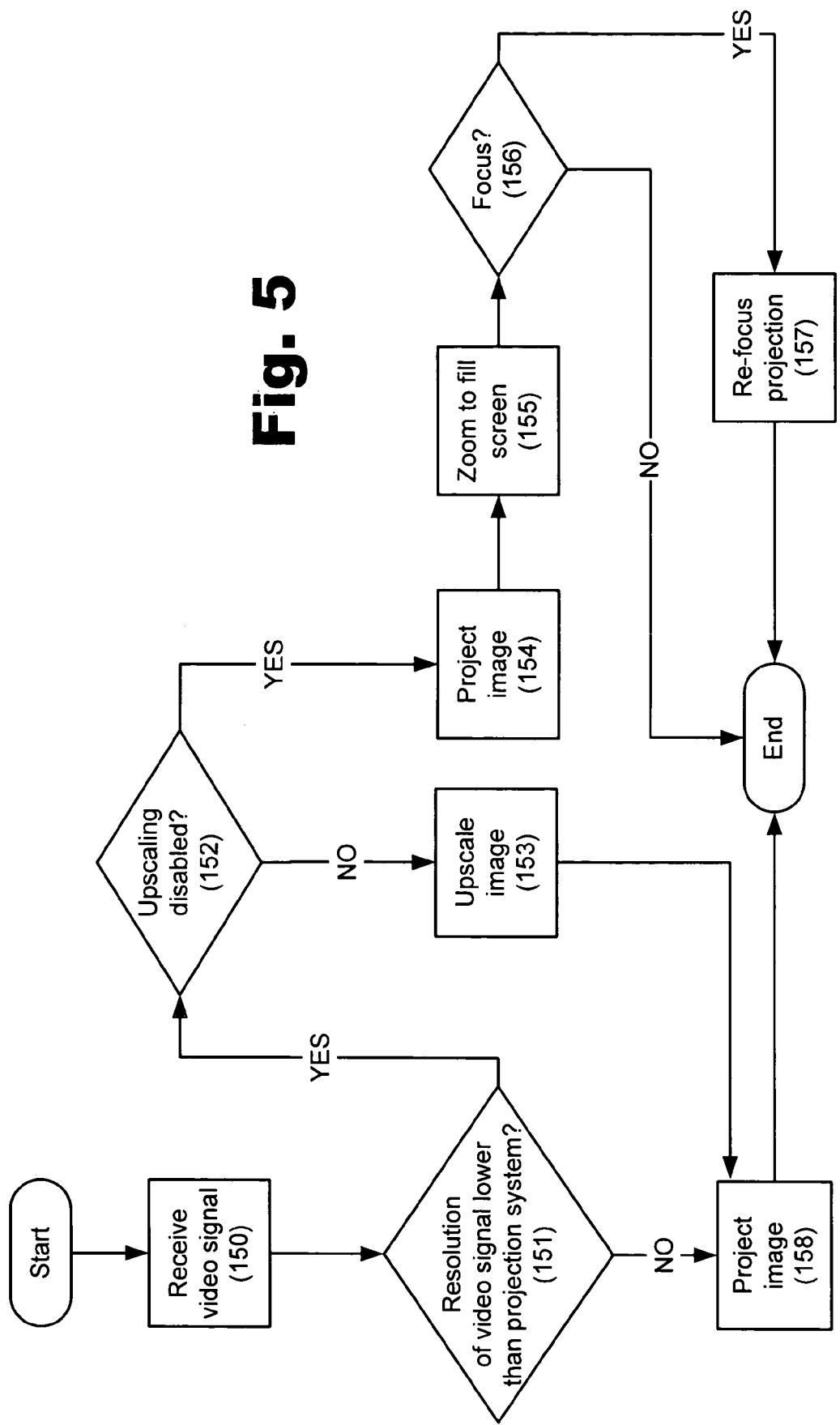
FIG. 5 is a flowchart illustrating operation of the projection system of FIG. 1 according to principles described herein.

FIG. 5 is a flowchart illustrating operation of the projection system of FIG. 1 according to principles described herein. As shown in FIG. 5, the projection system receives a video signal (step 150). The resolution of the image(s) in this signal may or may not match the resolution of the projection system. The resolution of the image may be lower than that of the projection system.

If the resolution of the image for projection is the same as that of the projection system (determination 151), the image is projected (158). If, however, the resolution of the image for projection is lower than that of the projection system (determination 151), the image may be upscaled to match the resolution of the projection system.

If upscaling is enabled (determination 152), the image is upscaled (step 153) and then projected (step 158). If, however, upscaling is disabled, for example, to avoid scaling artifacts, the image is projected without upscaling (step 154) and is zoomed to fill the screen or the desired projection surface (step 155). As described above, the projection system will likely contain a specific zoom setting, predetermined by the user during a calibration process or factory-loaded, that is implemented based on the resolution of the image to be projected. The processor of the projector will be programmed, in some examples, to automatically detect the resolution of the image to be projected and to adjust the zoom control accordingly.

After the image has been zoomed, it may need to be refocused (determination 156). If refocusing is needed (determination 156), the projection system is refocused (step 157). As described above, the refocusing may be manual or automatic. In some example, the processor of the projector wil be programmed to automatically refocus the image after a zoom based on focus settings predetermined by the user during a calibration process or factory-loaded.

Figure 6:
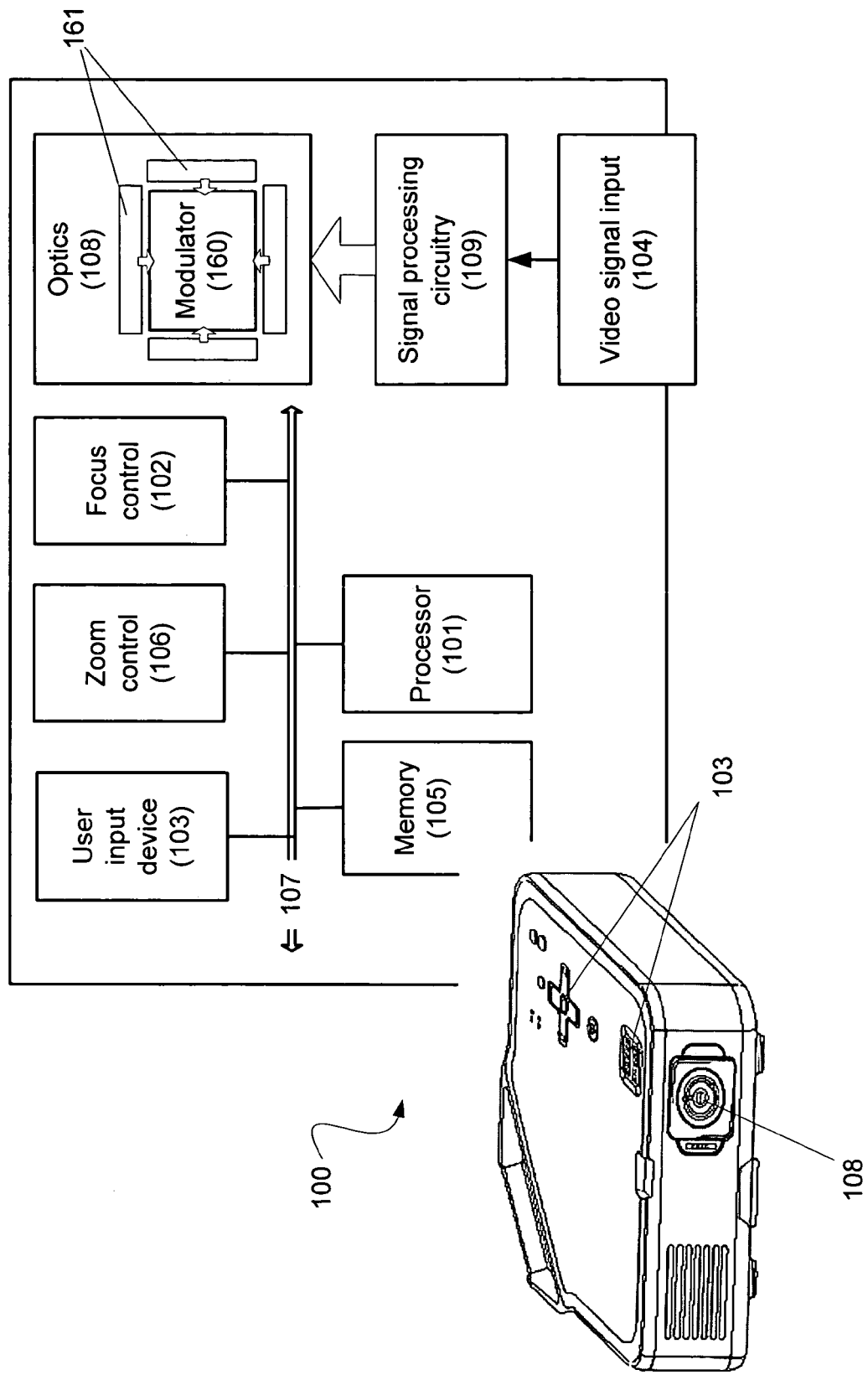
FIG. 6 is an illustration of another exemplary projection system according to principles described herein.

FIG. 6 is an illustration of another exemplary projection system according to principles described herein. The example illustrated in FIG. 6 is similar in many respects to the projection system described above in connection with FIG. 1.

As in the example of FIG. 1, a processor (101) coordinates and controls the operation of the various components of the projector (100). A memory (105) stores the firmware or programming executed by the processor (101), and a system bus (107) interconnects the internal elements of the projector (100).

The optics of the projector use a processed image signal from the processing circuitry (109) to visually produce and project the desired image. This is specifically accomplished with the modulator (160). The modulator (160) is driven with the processed image signal to generate the image to be projected. The modulator may be, for example, a liquid crystal display or micro-mirror device.

The optics (108) of the projector include a projection lamp for generating a projection light beam and a reflector for collecting the light from the projection lamp and directing the projection light beam. The projection light beam is then passed through or reflected from the modulator, sometimes referred to as spatial light modulator. The result is that the image formed on the modulator is then carried by the projection light beam and can be projected to display the desired image.

The other components of the projector optics (108) direct, control and focus the projection light beam to project the image on the target screen or projection surface. As before, some of the projector optics (108) will also be moveable with respect to other optic elements to allow for adjustment of zoom and focus of the image projected by the projector.

As described above, when the video signal received through the input (104) is of a lower resolution than the resolution of the projector (100), the projected image is zoomed to fill the same space that would have been filed if the resolution of the video signal matched that of the projector (100). This may be done, for example, by the processor (101) detecting the resolution of the input video signal and then operating the zoom control (106) to automatically adjust the zoom such that the projected images fills the screen or other projection surface as it would have if the resolution of the video signal matched that of the projector (100). The amount of the zoom needed depends on the resolution of the incoming video signal.

If the images of the video signal received through the input (104) are of a lower resolution than the resolution of the projector (100), and upscaling is not performed, the lower resolution image will be formed at the center of the modulator (160). The edges of the modulator (160) around the image will be set to black or not used corresponding to the border (122) shown in FIG. 3.

Where this is the case, it may be advantageous to physically cover those portions of the modulator (160) that represent the border (122, FIG. 3). This increases the perceived contrast due to less light scattering from the unused portions of the modulator. Consequently, the exemplary projection system of FIG. 6 has shutters (161) that are disposed around the modulator (160) and can be selectively extended over the modulator (160) to physically cover those portions of the modulator (160) that represent the border (122, FIG. 3).

These shutters (161) can be driven and controlled by the processor (101). Thus, the processor (101) can automatically extend the shutters (161) in accordance with the resolution of the incoming projection image so as to cover portions of the modulator (160) that are not used to form the image of the un-scaled projection image. The image on the modulator (160) is then picked up with the projection light beam, zoomed to fill the screen or projection surface and projected.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A projection system for projecting an image based on a received video signal, said system comprising:
   optics having a corresponding resolution; and
   a zoom control controlling a zoom of said optics;
   wherein, if a resolution of said image of said video signal is less than said resolution corresponding to said optics, said zoom control zooms a projected image while maintaining said resolution of said image.

2. The projection system of claim 1, wherein said zoom control, if the resolution of said image of said video signal is less than said resolution corresponding to said optics, zooms said projected image to fill a screen.

3. The projection system of claim 1, wherein said zoom control, if the resolution of said image of said video signal is less than said resolution corresponding to said optics, zooms said projected image to fill a target projection surface.

4. The projection system of claim 1, further comprising a processor configured to determine said resolution of said image and operate said zoom control in response to said resolution of said image.

5. The projection system of claim 4, wherein said processor operates said zoom control in accordance with zoom settings stored in a memory of said projection system by a user calibrating said system.

6. The projection system of claim 4, wherein said processor operates said zoom control in accordance with zoom settings stored in a memory of said projection system by a manufacturer of said system.

7. The projection system of claim 1, further comprising a focus control for refocusing said optics when said projected image is zoomed.

8. The projection system of claim 7, further comprising a processor programmed to determine said resolution of said image and operates said zoom control in response to said resolution of said image, wherein said processor also operates said focus control to refocus said optics when said projected image is zoomed.

9. The projection system of claim 8, wherein said processor operates said focus control in accordance with focus settings stored in a memory of said projection system by a user calibrating said system.

10. The projection system of claim 8, wherein said processor operates said focus control in accordance with focus settings stored in a memory of said projection system by a manufacturer of said system.

11. The projection system of claim 1, wherein said zoom control is only operated if a scaling function of said projection system is deactivated.

12. The projection system of claim 1, further comprising shutters for selectively covering portions of a modulator of said optics, which portions of said modulator are not used to produce said image when said resolution of said image of said video signal is less than said resolution corresponding to said optics.

13. A method for projecting an image with a projection system, said method comprising zooming said projected image in accordance with a resolution of said image, when a resolution of said image is less than a resolution corresponding to said projection system; wherein said zooming maintains said resolution of said projected image.

14. The method of claim 13, further comprising zooming said projected image to just fill a screen or other projection surface.

15. The method of claim 13, further comprising automatically determining said resolution of said image and automatically operating a zoom control in response to said resolution of said image.

16. The method of claim 15, wherein operating said zoom control comprises operating said zoom control in accordance with zoom settings stored in a memory of said projection system by a user calibrating said system.

17. The method of claim 15, wherein operating said zoom control comprises operating said zoom control in accordance with zoom settings stored in a memory of said projection system by a manufacturer of said system.

18. The method of claim 13, further comprising refocusing said projection system when said projected image is zoomed.

19. The method of claim 18, wherein refocusing said projection system comprises automatically refocusing said projection system when said projected image is zoomed.

20. The method of claim 19, further comprising refocusing said projection system using focus settings stored in a memory of said projection system by a user calibrating said system.

21. The method of claim 19, further comprising refocusing said projection system using focus settings stored in a memory of said projection system by a manufacturer of said system.

22. The method of claim 13, wherein said zooming is performed only if a scaling function of said projection system is deactivated.

23. The method of claim 13, further comprising selectively covering portions of a modulator of said projection system, wherein said portions of said modulator selectively covered are portions not used to produce said image when said resolution of said image is less than a resolution corresponding to said modulator.

24. A projection system for projecting an image comprising:
means for forming said image for projection; and
means for zooming a projected image in accordance with a resolution of said image while maintaining said resolution of said image, when a resolution of said image is less than a resolution corresponding to said means for forming said image.

25. The system of claim 24, wherein said means for zooming zoom said projected image to just fill a screen or other projection surface.

26. The system of claim 24, further comprising means for automatically determining said resolution of said image and automatically operating said means for zooming in response to said resolution of said image.

27. The system of claim 24, wherein said means for zooming operate in accordance with zoom settings stored in a memory of said projection system by a user calibrating said system.

28. The system of claim 24, wherein said means for zooming operate in accordance with zoom settings stored in a memory of said projection system by a manufacturer of said system.

29. The system of claim 24, further comprising means for refocusing said projection system when said projected image is zoomed.

30. The system of claim 29, wherein said means for refocusing comprise means for automatically refocusing said projection system when said projected image is zoomed.

31. The system of claim 30, wherein said means for refocusing operate using focus settings stored in a memory of said projection system by a user calibrating said system.

32. The system of claim 30, wherein said means for refocusing operate using focus settings stored in a memory of said projection system by a manufacturer of said system.

33. The system of claim 24, wherein zooming of said projected image is performed only if a scaling function of said projection system is deactivated.

34. The system of claim 24, further comprising means for selectively covering portions of a modulator of said projection system, wherein said portions of said modulator selectively covered are portions not used to produce said image when said resolution of said image is less than a resolution corresponding to said modulator.

35. A projection system for projecting an image based on a received video signal, said system comprising:
optics including a modulator having a corresponding resolution; and
a zoom control;
wherein, if a resolution of said image of said video signal is less than said resolution corresponding to said modulator, said zoom control zooms a projected image while maintaining said resolution of said image.

36. The projection system of claim 35, wherein said zoom control, if the resolution of said image of said video signal is less than said resolution corresponding to said modulator, zooms said projected image to fill a screen.

37. The projection system of claim 35, wherein said zoom control, if the resolution of said image of said video signal is less than said resolution corresponding to said modulator, zooms said projected image to fill a target projection surface.

38. The projection system of claim 35, further comprising a processor programmed to determine said resolution of said image and operates said zoom control in response to said resolution of said image.

39. The projection system of claim 38, wherein said processor operates said zoom control in accordance with zoom settings stored in a memory of said projection system by a user calibrating said system.

40. The projection system of claim 38, wherein said processor operates said zoom control in accordance with zoom settings stored in a memory of said projection system by a manufacturer of said system.

41. The projection system of claim 35, further comprising a focus control for refocusing said optics when said projected image is zoomed.

42. The projection system of claim 41, further comprising a processor configured to determine said resolution of said image and operate said zoom control in response to said resolution of said image, wherein said processor also operates said focus control to refocus said optics when said projected image is zoomed.

43. The projection system of claim 42, wherein said processor operates said focus control in accordance with focus settings stored in a memory of said projection system by a user calibrating said system.

44. The projection system of claim 42, wherein said processor operates said focus control in accordance with focus settings stored in a memory of said projection system by a manufacturer of said system.

45. The projection system of claim 35, wherein said zoom control is only operated if a scaling function of said projection system is deactivated.

46. The projection system of claim 35, further comprising shutters for selectively covering portions of said modulator not used to produce said image when said resolution of said image of said video signal is less than said resolution corresponding to said modulator.

* * * * *